UNITED STATES PATENT OFFICE.

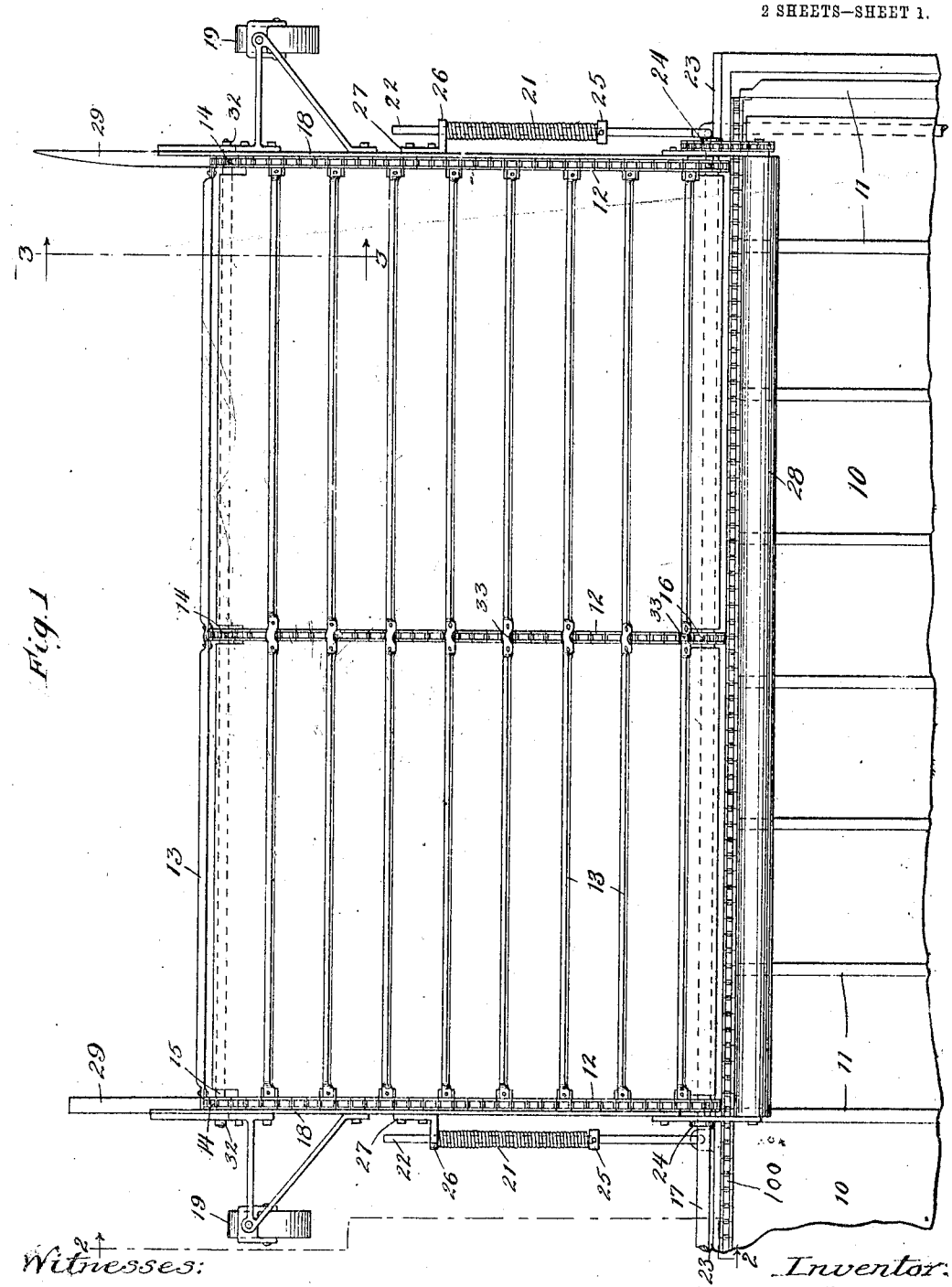

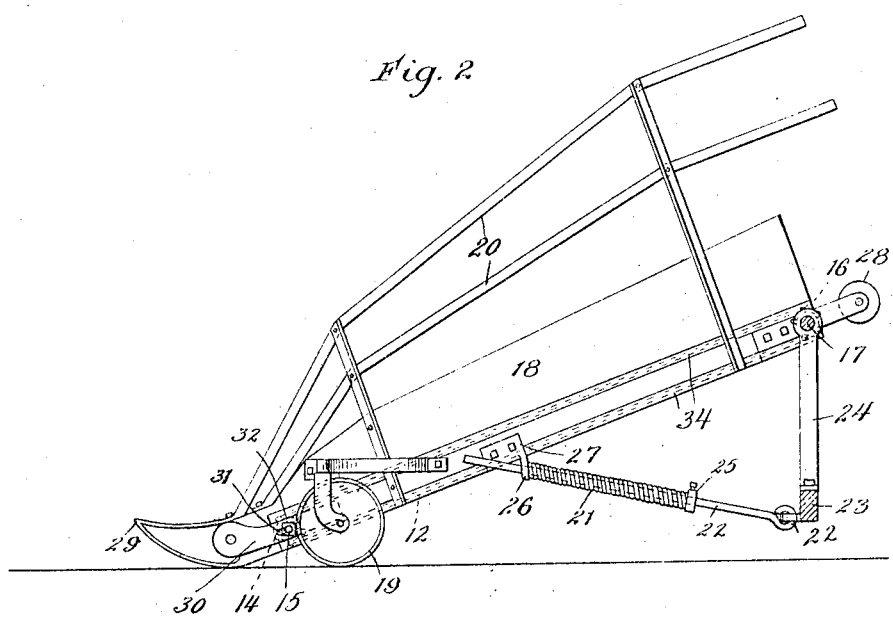
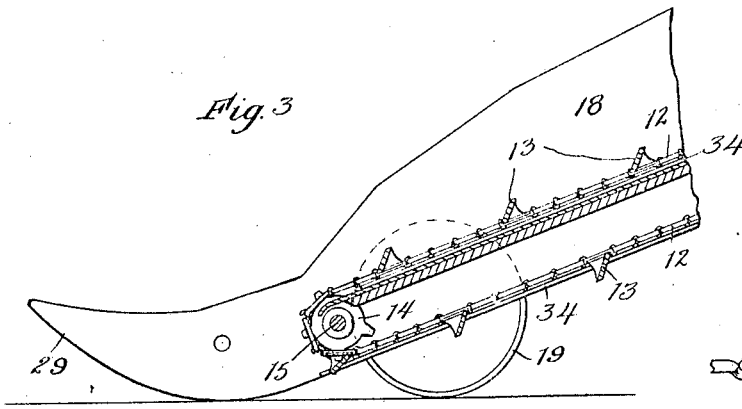
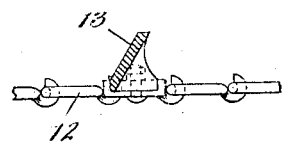
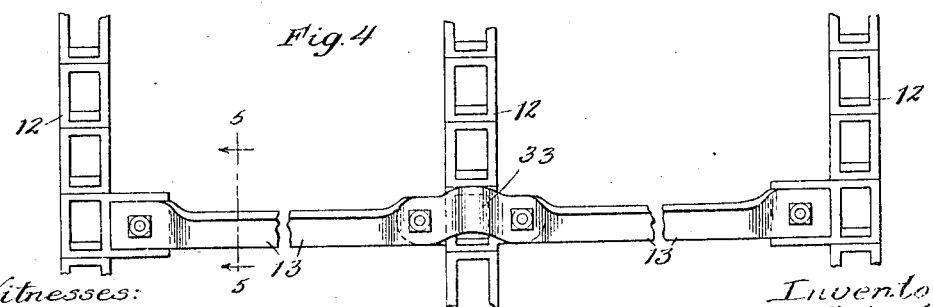

JOHN S. RICHARDSON, OF NOWESTA, NORTH DAKOTA, ASSIGNOR TO WALTER GREGORY, TRUSTEE, OF MINNEAPOLIS, MINNESOTA.

BUNDLE-LOADER.

No. 844,747.

Specification of Letters Patent.

Patented Feb. 19, 1907.

Application filed September 3, 1904. Renewed September 22, 1906. Serial No. 335,815.

*To all whom it may concern:*

Be it known that I, JOHN S. RICHARDSON, a citizen of the United States, residing in Nowesta, in the county of Pembina and State of North Dakota, have invented a new and useful Improvement in Bundle-Loaders, of which the following is a specification.

This invention relates to machines for picking up bundles or sheaves of grain from the ground and loading them onto wagons or racks moved at the side of the machine; and its main object has been the simplification of the construction of the picking-up mechanism shown in a prior application, Serial No. 184,295, filed by me on the 8th day of December, 1903.

The nature of my present improvements is fully disclosed below and illustrated in the accompanying drawings, forming a part of this specification, and in said drawings—

Figure 1 is a partial plan showing the parts of the machine to which my invention relates. Fig. 2 is a vertical section on line 2 2 of Fig. 1. Fig. 3 is a section on line 3 3 of Fig. 1. Fig. 4 is a plan of the chains and blades, and Fig. 5 is a section on line 5 5 of Fig. 4.

The machine of my present application is like that of my previous one in that it embodies an elevator or belt to which the bundles are delivered by the pick-up mechanism and by which they are raised to the proper height for delivery to the wagon. This elevator is operated from the supporting-wheels in any suitable manner, and preferably in the manner set forth in said application. The present machine is also propelled by animal or other power, as set forth in said application. Inasmuch as the changes now made in the machine are in the pick-up mechanism, I have not thought it necessary to illustrate the other parts of the machine, with the exception of the elevator, a portion of the lower or receiving end of which is shown at 10 with its slats 11 and chain 100.

My improved pick-up mechanism consists of an inclined endless carrier of a width considerably exceeding the length of the bundles and having one end close to the ground and the other elevated to a plane over that of the receiving end of the elevator 10. This carrier consists of carrying means, such as the parallel chains 12, preferably three in number, and blades 13, secured edgewise upon the chains or other carrying means. The chains pass over sprockets 14 on a shaft 15 at the lower end of the carrier and over sprockets 16 on a driven shaft 17 at the upper end of the carrier. The blades are thus secured upon the chains or other carrying means so that as they are moved around the lower sprockets they project in a manner which adapts them to enter under and lift the bundles lying in their path, and I find it desirable that they project from the chains in a forwardly-inclined direction of about forty degrees from the vertical, as seen at Fig. 3, and their outer edges are also beveled backwardly at an angle of about thirty degrees to the plane of the blades, as also shown in said figure, so that their forward corners are sharp and adapted to indent themselves into the bundles, and thereby be rendered efficient in taking hold and lifting them. The upper sprockets may receive power in the manner described in my previous application, and the blades are employed in such number as may be necessary to enable them to form a moving grating, through the openings of which the bundles after they are raised from the ground cannot fall.

At each side the pick-up mechanism is provided with a wind-board 18, through which the sprocket-shafts pass and by which the lower one is supported, and the lower end is provided with supporting-rollers 19, as clearly shown. Above the wind-boards a vertical framework 20 may be employed to prevent the bundles from being thrown off at the sides.

The pick-up mechanism is attached to the side of the elevator 10 with freedom to rise and fall with the unevennesses of the ground, the shaft 17 serving as a pivot upon which it may rock. A portion of the weight of the forward end of the mechanism is taken from the rollers 19 by means of springs 21 at each side of the mechanism, such springs being mounted on rods 22, freely joined to a stationary bar 23, located below the shaft 17 and parallel therewith and supported by hangers 24. The springs are confined on the rods 22 between the collar 25, fast on the rod, and the collar 26, loose on the rod, and having a wing 27, by means of which it is secured to the adjacent wind-board. The springs are compressed and exert a lifting-power on the forward end of the mechanism, preventing the rollers from entering soft ground to too great a depth. A roller 28, extending from side to side of the pick-up mechanism, is arranged at the head of the latter and is adapted to draw the bundles from the grating and deliver them to the elevator 10. This roller is preferably driven as shown at Fig. 1. The sides of the mechanism are also desirably provided with shoes 29, adapted to ride upon the ground. The blades are preferably integral from side to side of the mechanism and are bent up at their centers, as seen at 33, so they may not interfere with the sprockets of the central chain.

In order to take up slack in the chains, the lower shaft has its ends reduced in diameter and threaded, and such ends are passed through elongated slots 31 in metal pieces 30, attached to the shoes 29. The nuts 32 on the reduced ends clamp the shaft firmly in any desired position within the limits of the slots 31. Between the sprocket-wheels the sprocket-chains 12 ride upon and are supported by angle-irons 34.

While I have shown the pick-up mechanism as supported at its forward end both by caster-wheels and shoes, it will be understood that the shoes do not normally rest upon the ground, but are employed to support the pick-up mechanism when the caster-wheels enter hollows in the ground, and thereby to prevent the mechanism from falling so far as might result in its coming in contact with the ground or other obstructions. It will be noted that the caster-wheels are adapted to turn or swivel in the devices by which they are attached to the machine, and they may also be attached at different heights, so as to regulate the height of the forward end of the pick-up mechanism, if desired.

I claim—

1. In a bundle-loader, the combination with an elevator for raising the bundles to the wagon, of mechanism for picking the bundles up from the ground and delivering them to said elevator, such mechanism consisting of an endless carrier moving over wheel at top and bottom, and having transverse blades adapted to lift the bundles onto the upper course of the carrier and to insure their transfer to said elevator.

2. In a bundle-loader, an endless moving pick-up device pivotally connected to the main frame of the machine and consisting of flexible endless carrying means and blades adapted to lift the bundles from the ground.

3. In a bundle-loader, an endless moving pick-up device pivotally connected to the main frame of the machine and consisting of flexible endless carrying means and blades, the latter projecting from the carrying means so as to adapt them to lift the bundles from the ground.

4. In a bundle-loader, an endless moving pick-up device pivotally connected to the main frame of the machine and consisting of a flexible endless conveying means and blades, the latter projecting from the endless conveying means and inclined forwardly so as to adapt them to lift the bundles from the ground.

5. In a bundle-loader the pick-up mechanism such as that described, pivotally connected to the main frame of the machine, and with its forward end resting upon the ground, in combination with means for partially supporting such forward end from the main frame.

6. In a bundle-loader the pick-up mechanism such as that described, pivotally connected to the main frame of the machine, and with its forward end resting upon the ground, in combination with springs tending to lift such forward end.

7. In a bundle-loader, pick-up mechanism essentially such as described pivotally connected to the main frame of the machine, and having both shoes and rollers supporting the forward end.

8. In a bundle-loader, pick-up mechanism essentially such as described pivotally connected to the main frame of the machine, and having both shoes and rollers supporting the forward end from the ground, and spring devices supporting the same end from the main frame.

9. In a bundle-loader, pick-up mechanism consisting of flexible carrying means and blades projecting forwardly and outwardly, and having their forward outer corners sharpened.

10. In a bundle-loader, pick-up mechanism essentially such as described, pivotally connected to the main frame of the machine and having rollers supporting its forward end, and also having means for preventing the mechanism from falling too far when the rollers enter hollows in the ground.

11. In a bundle-loader, pick-up mechanism essentially such as described, pivotally connected to the main frame of the machine and having swiveled rollers supporting its forward end.

12. In a bundle-loader, the combination with a main frame, of a pick-up mechanism pivotally connected to the front of the main frame and having its forward end adapted to rest upon the ground and follow the inequalities thereof.

13. In a bundle-loader, pick-up mechanism essentially such as described, pivotally connected to the main frame of the machine and having its forward end adapted to rest upon the ground and to follow the inequalities thereof.

JOHN S. RICHARDSON.

Witnesses:
H. M. MUNDAY,
EDMUND ADCOCK.